May 15, 1956     O. F. CARLSON     2,745,628
VALVE
Filed Nov. 17, 1952
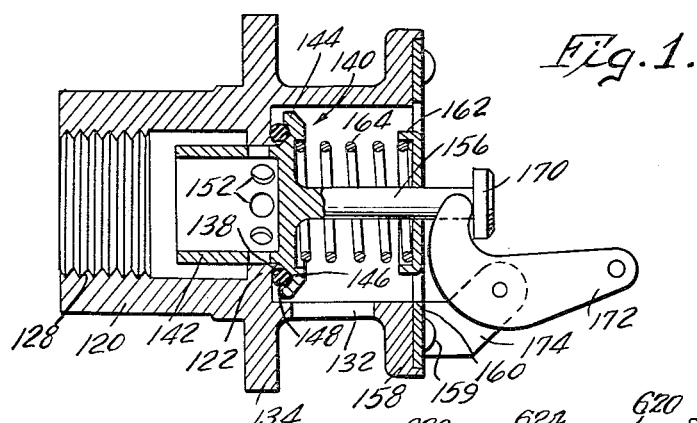
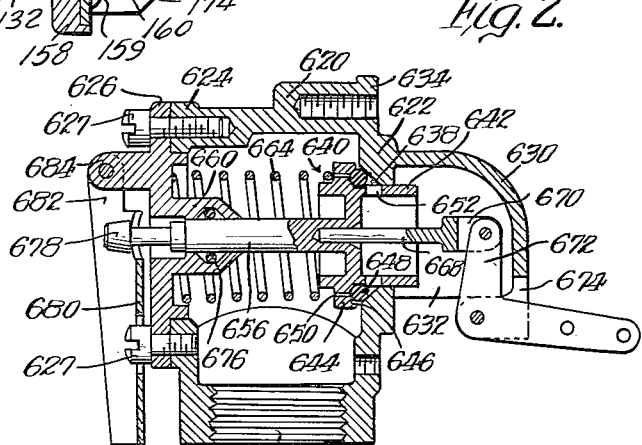
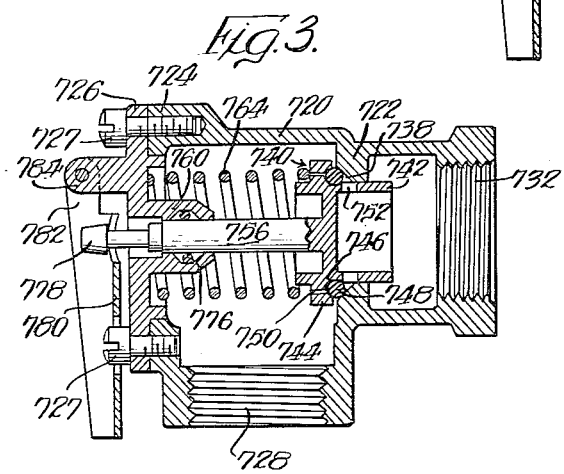
INVENTOR.
Oscar F. Carlson
BY
Brown, Jackson, Boettcher & Diemer
Attys:

United States Patent Office 2,745,628
Patented May 15, 1956

2,745,628

VALVE

Oscar F. Carlson, Evanston, Ill.

Application November 17, 1952, Serial No. 320,845

2 Claims. (Cl. 251—83)

The present application relates to improvements in valves and is a continuation in part of my copending application, Serial No. 247,734, filed September 21, 1951.

It is an object of the present invention to provide improved valves including an inclined valve seat, a valve having a face movable toward and away from the seat, the valve having an annular groove in the said face thereof, an O-ring seal positioned in said groove and adapted to provide a live seal between the inclined valve seat and the face of the valve, the valve having a cylinder portion adjacent the said face thereof extending through and guided for slidable movement by the member defining the inclined valve seat, the valve being pressure responsive, and means for effecting actuation of said valve manually and/or by means of various control instrumentalities.

A further object of the invention is the provision of improved valves that are economical of manufacture and assembly and at the same time adapted for long service in control apparatus of high sensitivity and accuracy.

Other objects and advantages of the present invention will become apparent in the following detailed description of preferred embodiments of the invention.

Now, in order to acquaint those skilled in the art with the manner of making and using the improved valve of my invention, I shall describe, in connection with the accompanying drawings, several preferred embodiments of the valve and the manner of making and using the same.

In the drawings:

Figure 1 is a vertical longitudinal cross sectional view of one embodiment of the improved valve of the present invention;

Figure 2 is a similar view of a second embodiment; and

Figure 3 is a similar view of a third embodiment.

For the sake of convenience, each embodiment of the invention disclosed herein will be described in conjunction with reference numerals in a hundred series and in all views like tens and digits numbers will refer to the same or similar parts.

Referring now to Figure 1, the first embodiment of the improved valve of my invention is shown as including a generally tubular body member 120 provided intermediate its ends with a radially inwardly extending flange 122 defining a valve port. At one end thereof, the tubular body 120 is internally threaded to provide a fluid port 128. To the opposite side of the valve port, the tubular body 120 is provided with a radical hole 132 defining a fluid port. As will be apparent as the description proceeds, either port may be utilized as the inlet port of the valve. Intermediate its ends, the body 120 is provided with a radially outwardly extending flange 134 by means of which the valve may be mounted on the wall of a vessel or the like, preferably with the port defined by the radial hole 132 disposed to the inside of the vessel. In such use, the valve may comprise either an inlet or an outlet valve for the vessel. In one preferred use, however, the valve is utilized as an outlet valve, in which case the axial port 128 comprises the valve outlet and the radial port 132 comprises the valve inlet. Accordingly, the ports 128 and 132 will be referred to hereinafter as the outlet and inlet ports, respectively.

The flange 122 defining the valve port within the body is provided to the inlet port side thereof with an axially extending portion presenting an outer inclined surface or valve seat 138 facing toward the valve inlet. A valve member 140, which is generally cylindrical, is slidably received within the bore of the body 120 and is provided with a cylindrical, preferably tubular, and portion 142 having a sliding fit in the valve port. As is clearly shown, the tubular portion 142 extends through and is guided for sliding movement by the flange 122 defining the valve port. To the valve seat side of the flange 122, the valve member 140 is provided with a radially outwardly extending flange 144 having one side thereof facing toward the valve seat. In the face of the valve member, an annular groove 146 is formed, the groove being generally V-shaped in cross section. Disposed within the groove 146 is a conventional resilient O-ring seal 148, a torus formed of rubber or a rubber like material, adapted to engage against the valve seat. Due to the inclination of the valve seat, the O-ring will be biased outwardly each time the same is moved into engagement with the seat to provide a highly efficient seal between the sides of the V groove in the face of the valve member and the inclined valve seat. Since the resilient O-ring is biased outwardly or flexed each time the valve is closed, the seal will be "alive" or "plastic" at all times and will insure an active and effective seal despite long periods of use.

Adjacent the radial flange 144, the tubular portion 142 of the valve member 140 is provided with a plurality of radial holes 152 adapted to establish communication between the opposite sides of the valve port when the valve 140 and the seal 148 are moved away from the inclined valve seat 138. To the side of the sealing flange 144 thereof opposite the tubular portion 142, the valve member 140 is provided with a reduced axial integral stem 156 extending toward and beyond the end of the body. At the end thereof, the body 120 is provided with an outwardly extending radial flange 158 to which is secured, suitably by screws or rivets 159, an end plate or diaphragm 160 having a central aperture therein through which the valve stem 156 extends, the stem being guided for sliding movement by the diaphragm. The diaphragm or end plate 160, around the central aperture therethrough, is provided with a plurality of inwardly extending projections 162 stamped and bent out of the body thereof and forming a seat for one end of a spring 164 which engages the valve member 140 normally to bias the valve member to its seat and to effect a seal between the flange 144 and the inclined valve seat 138.

At the free end thereof, the stem 156 is provided with a head 170 adapted to be engaged by one end of a bell crank 172 which is pivotally supported by a bracket 174 which in turn is supported by the body. Preferably, the bracket 174 comprises a tab or a pair of tabs stamped and bent out of the body of the diaphragm 160. However, it will be appreciated that a separate bracket member may be provided and secured to the body means by one of the screws 159. As will be apparent, the free end of the bell crank 172 may be moved, downwardly, manually or by other control instrumentalities, to effect actuation of the valve. Downward movement of the free end of the bell crank 172 will be effective to open the valve and when the bell crank is released, the spring 164 will return the valve member 140 to its seat.

In use, the valve of Figure 1 may be used for various purposes, one of which, for example, is as an air valve disposed adjacent the top of an expansion tank for hot water heating systems and wherein the bell crank 172 is operatively associated with a float for actuation in response to the water level in the tank, as is disclosed in my said copending application. The body member 120 and the diaphragm 160 comprise body means having an inlet, an outlet and defining a valve port between the inlet and the outlet and an inclined valve seat adjacent or surrounding the valve port. The valve member is guided for sliding movement with respect to the valve seat by means of the tubular portion 142 thereof sliding within the valve port and the stem thereof sliding within the bore provided in the diaphragm 160. As the valve is opened and closed, the inclined valve seat 138 will insure flexing of the O-ring to provide "live" sealing action between the valve and the seat. While the use referred to hereinbefore is a preferred use of the particular embodiment of the valve of the present invention, it will be appreciated that the port 128 may be utilized as an inlet port and that the port 132 may comprise the outlet port, in which case the valve 140 will be responsive to fluid pressures within the inlet and may be adapted to be actuated in response to fluid pressure depending upon the calibration of the spring 164.

Referring now to Figure 2, I have shown therein a pressure responsive valve including means for effecting actuation thereof manually and means for effecting actuation thereof by means of various control instrumentalities, and wherein manual actuation is effected independently of the control instrumentalities and actuation by the control instrumentalities is effected independently of the manual actuating means. In this embodiment of my invention, the valve includes a body member 620 having an inwardly directed radial flange 622 defining a valve port within the body 620. At one end thereof, the body 620 is provided with an end face portion 624 adapted for the reception of a body end plate 626 which may be suitably secured to the body by means of screws 627 or the like. The body member 620 is so formed as to provide a radial port 628 therein, which will be referred to hereinafter as the valve outlet port. At the end thereof opposite the end plate 626, the body 620 is provided with a bell or dome shaped, cap-like portion 630 providing a radially disposed port 632, which will be referred to herein as the valve inlet port. Adjacent the cap-like portion 630, the body member 620 is provided with a radial flange or shoulder portion 634 having tapped bores therein and by means of which the valve may be suitably secured to the side wall of a pressure vessel or the like with the cap-like portion 630 disposed to the interior of the vessel.

The inwardly extending flange 622 is provided with a tapered counterbore defining an inclined valve seat 638 surrounding the valve port defined by the flange. A valve member 640 is disposed within the body member 620 for reciprocable movement with respect to the valve seat 638. The valve member 640 includes a cylindrical and preferably tubular end portion 642 extending through and guided for sliding movement by the valve port. At the inner end of the tubular portion 642, the valve member 640 is provided with a radially outwardly extending flange 644 having a face opposing the inclined valve seat 638. The valve flange 644 is provided in the said face thereof with an annular groove 646, which is preferably V-shaped in cross section, adapted for the reception of an O-ring seal 648. To provide for uniform seating of the O-ring 648, a plurality of breather ports 650 are provided in the valve flange to establish communication between the groove 646 and the outlet side of the valve. Adjacent the radial flange 644, the tubular portion 642 of the valve member is provided with a plurality of radial holes 652 to establish communication between the opposite sides of the valve port when the valve is open.

To the side of the flange 644 opposite the tubular portion 642, the valve member 640 is provided with a reduced, integral axial stem, which is slidably received within a bore provided in an axial extension 660 of the end plate 626. A spring 664 is confined between the end plate 626 and the flange 644 of the valve member normally to bias the valve member to its seat. At the end thereof facing into the tubular portion of the valve member, the valve stem 656 is provided with a bore adapted for the slidable reception of one end portion of an actuator rod 668. The free end of the rod 668 is enlarged and bifurcated for the reception between the bifurcations thereof of one end of a bell crank 672 which is pivotally supported intermediate its ends on an extension 674 of the cap-like portion of the body member 620.

The valve shown in Figure 2 is adapted for manual actuation from the exterior thereof, that is, from the exterior of that portion of the valve which is adapted to be disposed exteriorly of the tank with which the valve is adapted for association. To this end, the axial extension 660 on the end plate 626 is provided with a continuous bore through which the valve stem 656 extends to the exterior of the valve body means. Within the axial extension 660, an annular internal recess is provided within which an O-ring 676 is positioned to provide a seal between the body means and the valve stem 656. To the exterior of the body means, the valve stem 656 is provided with a reduced end portion provided at the free end thereof with a head 678 adapted to be engaged by an actuating lever 680. The actuating lever 680 has a slot therein through which the reduced portion of the valve stem freely passes. The actuating lever is preferably U-shaped in cross section with the said slot being provided in the base wall thereof so that as the lever is moved away from the body means or end plate, the base wall of the same will engage the head 678 to effect actuation of the valve member. At one end thereof, the base wall portion of the U-shaped lever 680 is cut away so as to provide a bifurcated end portion 682 by means of which the lever 680 is pivotally connected to an outwardly extending projection 684 provided on the end plate 626. As is clearly shown in Figure 2, the base wall of the lever 680 is apertured where necessary to accommodate passage of the heads of the screws 627.

In use, the valve member 640 is adapted to be fluid pressure actuated independently of the bell crank 672 and independently of the actuating lever 680, since the actuator rod 668 is slidably positioned within the bore of the valve stem and the reduced portion of the valve stem is slidable within the slot provided in the base wall of the actuating lever 680. Due to the slidable association of the actuator rod 668 with the valve stem, the lever 680 is adapted to effect actuation of the valve member, that is, movement of the valve member away from its seat, independently of the actuator rod 668 and the bell crank 672. Likewise, the bell crank 672 is adapted to effect actuation of the valve member independently of the lever 680 due to the fact that the reduced portion of the valve stem passes freely through the slot provided in the base wall of the lever. As will be appreciated from Figure 2 and the foregoing description, the valve is made in a particularly economical manner and provides highly efficient valve actuating means.

In Figure 3, I have shown a modification of the embodiment of the invention shown in Figure 2, wherein the valve is substantially identical to the valve of Figure 2 but does not include the cap-like portion 630, the bell crank 672 and the actuator rod 668. The embodiment of the invention shown in Figure 3 is particularly adapted for fluid pressure actuation and manual actuation, as will become apparent. As shown, the valve comprises a body 720 having a radially inwardly extending flange 722 defining a valve port. At one end thereof, the body 720 is provided with an end face 724 to which a body end plate 726 is suitably secured by means of screws 727 or the like. As will be obvious, the end plate 726 of the Figure 3 embodiment of the invention is the same as the end plate 626 in the Figure 2 embodiment of the invention. In the Figure 3 embodiment, the body 720 is so formed as to provide a radial port 728 comprising a fluid outlet port and an axial port 732 comprising an inlet port. Both of the ports 728 and 732 are preferably threaded for the reception of pipes or other conduit means.

To the outlet side thereof, the radially extending flange 722 is provided with a tapered counter bore defining an inclined valve seat 738 with which a valve member 740 is adapted for cooperation. The valve member 740 includes a cylindrical and preferably tubular end portion 742 extending through and guided for sliding movement by the valve port defined by the flange 722. The valve member 740 includes a radially outwardly extending flange 744 having a face opposed to the inclined valve seat 738. In the said face thereof, the valve flange 744 is provided with an annular groove 746, preferably V-shaped cross section, within which an O-ring 748 is adapted to be positioned. The valve flange 744 is provided with breather ports 750 to accommodate uniform seating of the O-ring 748 within the groove 746. To accommodate fluid flow to the opposite sides of the valve port when the valve is open, the tubular portion 742 of the valve member is provided with radial holes 752.

The valve member 740 is provided with a reduced axial integral stem 756 which is adapted to be received within and guided for sliding movement in a bore provided in an axial extension 760 on the end plate 726. A spring 764 is confined between the end plate 726 and the valve member 740 normally to bias the valve to closed position.

The axial extension 760 of the end plate 726 is provided with an internal annular recess adapted for the reception of an O-ring 776 providing a seal between the body means of the valve and the valve stem 756. Exteriorly of the end plate 726, the valve stem 756 is provided with a reduced end portion terminating in a head 778. The reduced portion of the valve stem passes through a slot provided in the base wall of a generally U-shaped actuating lever 780, which lever is provided with a bifurcated end portion 782 adapted for pivotal connection to an outwardly extending projection 784 provided on the end plate 726. The operation and use of the valve shown in Figure 3 will be obvious from the hereinbefore description of the embodiment of the invention shown in Figure 2.

In Figure 1, the inclined valve seat is shown as being inclined downwardly and away from the valve port, while in Figures 2 and 3, the inclined valve seat is shown as being inclined downwardly and inwardly toward the valve port. In practice, either inclination of the valve seat may be utilized as desired, the primary consideration being to provide some inclination to insure the maintenance of a "live" seal between the valve and its seat during prolonged periods of use of the valve. In particular, the inclined valve seat provided by the present invention is adapted to effect a flexing of the seal upon each actuation of the valve member so as to insure a uniform and effective seating of the seal between the inclined valve seat and the annular groove provided in the valve member, as pointed out hereinbefore, the annular groove provided in the valve member is preferably of generally V-shape in cross section so as to insure an effective seating of the O-ring in the groove. Also, the provision of a V-groove defines an air space behind the O-ring so that when the breather ports are provided in the valve member perfectly uniform and effective seating of the O-ring within the groove is insured.

As will be apparent from the foregoing, the present invention provides improved valves of extremely practical construction wherein the valve member is positively guided in its reciprocation with respect to the improved valve seat provided by the present invention and wherein the valve member may be pressure actuated independently of various actuating instrumentalities. In the Figure 2 embodiment of the present invention, for example, pressure actuation may be accomplished independently of float actuation and manual actuation, manual actuation may be effected independently of float actuation, and float actuation may be effected independently of manual actuation.

From the foregoing, it will be appreciated that the present invention provides an extremely practical and improved valve enjoying substantial economies in manufacture and assembly. Also, the valves, due to their simple and practical construction, and due to the provision of a "live" seal, will perform efficiently and accurately throughout prolonged periods of use.

While I have described what I regard to be preferred embodiments of my invention, it will be apparent that various changes, rearrangements and modifications may be made therein without departing from the scope of the invention, as defined by the appended claims.

I claim:

1. A valve comprising body means having an inlet and an outlet and defining a valve port between said inlet and said outlet, said body means defining an inclined valve seat surrounding said valve port, a valve member slidably mounted within said body means and having a tubular portion slidably guided within said valve port, said valve means having a radial face opposing said inclined valve seat, said valve member having an annular groove in said face, a resilient O-ring seal positioned in said annular groove and including a portion extending axially outward of said groove toward said valve seat, whereby said O-ring is adapted to provide a resilient seal between said valve member and said valve seat, to close off said port, said valve seat with respect to the axially extending portion of said O-ring defining an inclined surface biasing said O-ring in a generally radial direction upon engagement of said O-ring with said valve seat, whereby said O-ring is flexed radially upon each opening and closing of the valve, said valve member having a stem extending from the surface thereof opposite said face of said member, said body means having a portion providing a bore within which said valve stem is slidably guided, resilient means confined between said body means and said valve member normally urging said valve member into engagement with said valve seat, said stem extending through said body means to the exterior thereof and including a head to the exterior of said body means, and an actuating lever pivotally mounted on said body means to the exterior thereof and having an aperture therein through which said stem freely extends, said lever upon movement away from said body member being adapted to engage said head on said valve stem to move said valve member away from said valve seat, said valve member being adapted to be actuated by fluid force exerted on the said face thereof independently of said lever.

2. A valve comprising body means having an inlet and an outlet and defining a valve port between said inlet and said outlet, said body means defining an inclined valve seat surrounding said valve port, a valve member slidably mounted within said body means and having a tubular portion slidably guided within said valve port, said valve member having a radial face opposing said inclined valve seat, said valve member having an annular groove in said face, a resilient O-ring seal positioned within said annular groove and including a portion extending axially outward of said groove toward said valve seat, whereby said O-ring is adapted to provide a resilient seal between said valve member and said valve seat to close off said port, said valve member having an axial stem extending away from the said face thereof, said body means having a portion providing a bore within which said valve stem is slidably guided, resilient means confined between said body means and said valve member normally to bias said valve member into engagement with said valve seat, said stem extending through said body means to the exterior thereof and including a head to the exterior of said body means, an actuating lever pivotally mounted on said body member to the exterior thereof and having an aperture therein through which said stem freely extends, said lever upon movement away from said body member being adapted to engage said head on said stem to move said valve member away from said valve seat, said valve stem having a bore therein adjacent the said face of said valve member, an actuator rod slidably positioned in said bore in said stem, and a bell crank pivotally mounted on said body means and operatively associated with said actuator rod, said bell crank being adapted to actuate said rod to move said valve member away from said valve seat, said valve member being adapted to be actuated by said lever independently of said rod and said bell crank and being adapted to be actuated by said bell crank independently of said lever, and being adapted to be actuated by fluid force exerted on the said face of said valve member independently of both said rod and bell crank and said lever.

References Cited in the file of this patent

UNITED STATES PATENTS

| | | |
|---|---|---|
| 1,216,963 | Dodd | Feb. 20, 1917 |
| 1,640,194 | Klinzing | Aug. 23, 1927 |
| 1,716,896 | Miller | June 11, 1929 |
| 2,138,125 | Schultz | Nov. 29, 1938 |
| 2,295,445 | Anschicks | Sept. 8, 1942 |
| 2,417,494 | Hoof | Mar. 18, 1947 |
| 2,471,615 | Gladden | May 31, 1949 |
| 2,481,482 | Green | Sept. 13, 1949 |
| 2,538,364 | James | Jan. 16, 1951 |
| 2,578,797 | Gordinier | Dec. 18, 1951 |
| 2,602,631 | Eickmeyer | July 8, 1952 |
| 2,622,842 | Coffey | Dec. 23, 1952 |

FOREIGN PATENTS

| | | |
|---|---|---|
| 12,911 | Great Britain | May 18, 1905 |
| 396,522 | Great Britain | Aug. 10, 1933 |
| 605,320 | Great Britain | July 21, 1948 |